United States Patent [19]

Schenck et al.

[11] 3,906,825

[45] Sept. 23, 1975

[54] BELT SHEARLINE HAVING METERING ROLLER

[75] Inventors: George E. Schenck, Dallastown; Robert L. Schenck; Frank W. Senft, both of York, all of Pa.

[73] Assignee: Schenck Corporation, York, Pa.

[22] Filed: Jan. 17, 1975

[21] Appl. No.: 542,009

Related U.S. Application Data

[63] Continuation-in-part of Ser. No. 478,172, June 10, 1974, abandoned.

[52] U.S. Cl. .................. 83/155.1; 83/157; 83/208; 83/268
[51] Int. Cl.[2] ...................... B23Q 7/00; B26D 5/20
[58] Field of Search .......... 83/155, 155.1, 157, 208, 83/268

[56] References Cited
UNITED STATES PATENTS

| | | | |
|---|---|---|---|
| 2,351,962 | 6/1944 | Harrison | 83/157 |
| 2,642,663 | 6/1953 | Long | 83/208 X |
| 3,230,807 | 1/1966 | Hill | 83/209 |
| 3,304,824 | 2/1967 | Hess, Sr. et al. | 83/104 |

*Primary Examiner*—Willie G. Abercrombie
*Attorney, Agent, or Firm*—Roylance, Abrams, Berdo & Kaul

[57] ABSTRACT

A shearline having an endless conveyor belt, frame and roller apparatus for supporting and driving the belt in conventional fashion and means for tilting the entire frame assembly to discharge cut material from the belt surface. A shear is mounted a known distance from the inlet end of the shearline. A measuring apparatus at the inlet end includes a metering roller extending transversely of the belt and an abutment plate downstream of the metering roller. The roller and plate are mounted on a pivoting mechanism having a pivot point between the plate and roller so that only one of those two articles is adjacent the surface of the belt at any one time. An idle lift roller raises the ends of plural rods as they are fed onto the belt to protect the belt surface. The abutment plate stops and squares the ends of the rods fed onto the inlet end of the belt. The plate establishes an initial distance from the shear. The pivot mechanism is then operated to lift the plate and lower the measuring and lift rollers after which the belt is driven to run the material toward the outlet end. After the metering roller has measured a predetermined amount of stock, the shear is actuated, cutting the stock as desired. The belt is then further moved to a discharge point at which the entire mechanism is tilted to discharge the cut bar into a receiving bin. The metering roller is provided with a pulse producing device and a control unit receives therefrom to control the operation of the belt drive, the tilting mechanism and the shear drive. In a further embodiment a separate metering roller in contact with the surface of the belt is provided, the pulse producing unit being driven by the separate metering roller. The separate roller is mounted on the machine frame and does not tilt with the belt and its associated equipment.

10 Claims, 10 Drawing Figures

BELT SHEARLINE HAVING METERING ROLLER

This application is a continuation-in-part of U.S. patent application Ser. No. 478,172, filed June 10, 1974, in the names of Robert L. Schenck, George F. Schenck and Frank W. Senft and entitled Roller-Metered Shearline, now abandoned.

This invention relates to an improved shearline and, more particularly, to a conveyor shearline having an improved measuring and conveying combination.

In the steel and construction industries, machines specifically designed to handle elongated metal stock such as reinforcing bar have come to be known as "shearlines", and it is to this specific field of equipment that the present invention is directed. However, as will be recognized, the principles disclosed herein can be employed in other forms of measuring and cutting machines.

The basic object of such equipment is to accept a length of reinforcing bar, or a plurality of such bars, and to measure predetermined lengths thereof, sever the bar at the appropriate point, and then convey the bar to a bin or another conveyor for subsequent handling and use. The bars to be handled by this equipment are quite large and heavy and the equipment itself is therefore necessarily relatively large, sturdily manufactured and relatively expensive.

One variety of shearline which is typical of the prior art is shown in U.S. Pat. No. 3,370,494 in which a plurality of rollers are employed to convey reinforcing bar along the conveyor frame. A selected one of a plurality of stops is caused to project upwardly between rollers, interrupting the travel of the reinforcing bar and causing the bar to come to an abrupt halt. A severing device, known as a shear, is located at the inlet end of the frame so that the length can be defined by the distance between the shear blade and the selected abutment stop. Thus, the stop is raised, the bar is stopped, the shear is actuated, and the stop is then lowered, permitting the cut bar to be further conveyed and then subsequently discharged.

While this kind of machine is highly effective and has proven its worth through years of use, it is relatively complicated and expensive because of the necessity for individual drives and controls for a large number of stops spaced at, for example, one or two foot intervals. Also, drives must be provided for all or most of the rollers to suitably propel the bar along the frame.

Still further, the entire frame must be longitudinally movable so that measurements at fractions of the spacing between stops can be accomplished.

Accordingly, it is an object of the present invention to provide a shearline which is rugged and durable and which provides for the measurement and cutting of reinforcing bar or similar stock at almost any selected length, but which is relatively simple and inexpensive to produce.

A further object is to provide a shearline having an endless belt conveyor and a work-contacting holding and metering roller to measure stock as it is advanced along the conveyor.

Yet another object is to provide a receiving assembly at the inlet end of a shearline conveyor in which a plurality of elements to be cut are aligned and then contacted and measured by a metering roller, the aligning means being mounted on a simple reliable movable assembly with the metering roller.

A further object is to provide an apparatus in which a metering roller is provided in contact with the conveyor belt.

Yet another object is to provide an aligning, measuring and conveying apparatus on a frame which is tiltable as a unit to dispense cut bar.

Briefly described, the apparatus of the invention includes an elongated frame having an endless conveyor belt, means for mounting the belt for movement in a conventional conveyor fashion and means for driving the belt in a direction to carry articles from an inlet end toward an outlet end. An abutment plate and a metering roller are carried by bracket means pivotally mounted on the frame with the abutment and the metering roller being perpendicular to the direction of motion of the belt. Means for pivoting the bracket means is provided to move the apparatus between one position in which the abutment plate is adjacent the belt surface with the roller spaced therefrom a distance sufficient to permit the insertion of stock, and a second position in which the plate is spaced from the belt at a distance sufficient to permit passage of stock while the roller is in contact with the stock and is rotated by such contact as the stock is carried by the belt. A shear is spaced a predetermined distance upstream of said plate. A second conveyor can also be employed to provide stock through the shear to the inlet end of the conveyor. The apparatus also preferably includes a control system including a pulse producing device connected to the roller, means for counting the pulses as a measure of roller rotation and stock length, and control means responsive to the pulse producing means for controlling the conveyor drive, the shear drive and the bracket pivoting means. The control means can also include the hinge and drive structure for tilting the entire conveyor. A lift roller at the inlet end keeps the ends of the rods, which are often jagged, spaced slightly above the belt surface to protect it. The lift roller is then lowered out of the way by the pivot operating means or similar device.

In another embodiment the pulse producing device is connected to a separate metering roller mounted on the stationary portion of the machine frame, the separate roller being in contact with the belt surface beneath the belt path of travel. The separate metering roller is mounted so as to not tilt with the conveyor mechanism, thereby simplifying the pulse producing apparatus and avoiding the need for flexible cables or concerns about the effects of vibration or relative movement of components.

In order that the manner in which the foregoing and other objects are attained in accordance with the invention can be understood in detail, a particularly advantageous embodiment thereof will be described with reference to the accompanying drawings, which form a part of this specification, and wherein.

Figure 1:
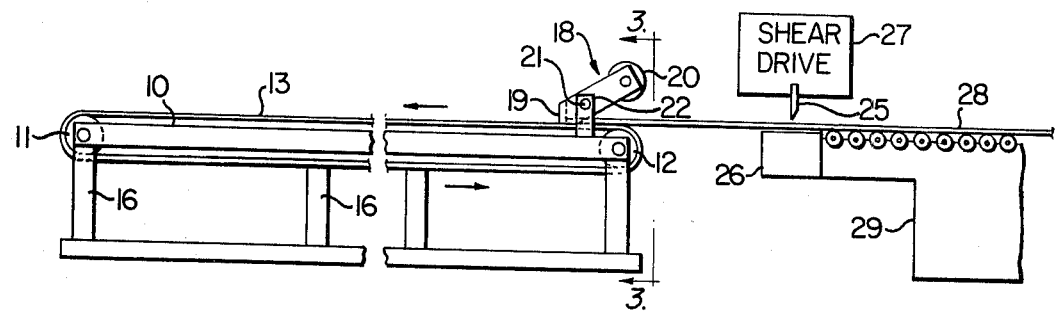
FIG. 1 is a schematic view, inside elevation of a shearline in accordance with the present invention.
Figure 2:
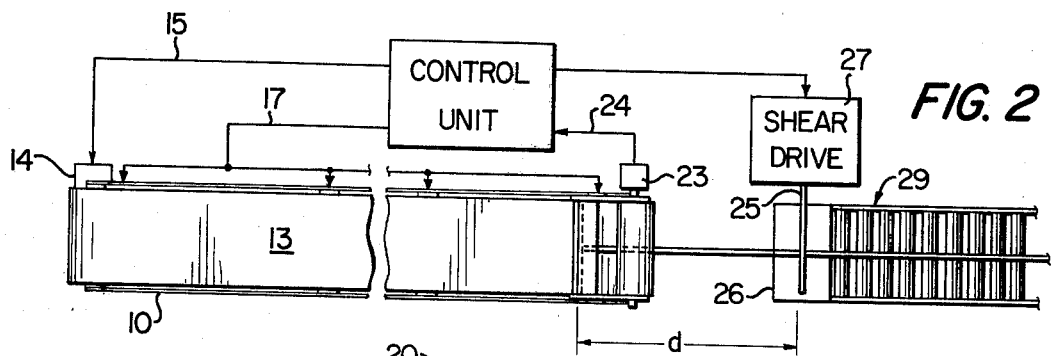
FIG. 2 is a plan view, in schematic form, of the system of FIG. 1.

Referring now to these drawings in detail, it will be seen from the schematic illustrations in FIGS. 1 and 2 that the apparatus of the invention includes a frame 10 which rotatably supports rollers 11 and 12 of a conventional type designed to support an endless conveyor belt 13 for movement, as indicated by the arrows, to convey material from an inlet end at roller 12 to an outlet end at roller 11. A conveyor belt drive 14 is coupled in any suitable manner to one or more of rollers 11 and 12 to provide the motive force for the conveyor. A control unit provides switching power to control energy for the conveyor belt drive, as indicated at 15.

The frame can be supported by a plurality of legs 16, some of which can be extendable and some of which can be connected to the frame by hinge means so that the entire assembly can be tilted to discharge articles therefrom, as will be described in greater detail hereinafter. The control unit also provides energy to the means for tilting as indicated at 17.

At the inlet end of the conveyor there is provided bracket means indicated generally at 18 for supporting an abutment plate 19 and a work-holding and metering roller 20 above the upper surface of belt 13. The bracket means is pivotally mounted, as at 21 on a support 22 attached to frame 10. Means for pivoting the bracket means, not shown in FIGS. 1 and 2, is also provided and is controlled by an output from the control unit.

Connected to roller 20 is a pulse generating unit 23 which is coupled to the rotating axle of roller 20 and is designed to produce pulses representative of rotary motion of the roller, the pulses produced thereby being conducted on a line 24 to the control unit. A shear 25 of conventional type having a blade and an anvil 26 are disposed adjacent the inlet end of the conveyor apparatus and provided with a shear drive 27 which also receives an activating signal from the control unit.

Work pieces, such as bar stock indicated at 28, are delivered to the input end of the shearline through shear 25 by conventional means such as a passive conveyor indicated generally at 29.

Of particular significance in the illustration of FIGS. 1 and 2 is the dimension d shown in FIG. 2, this dimension indicating the spacing between the upstream surface of abutment place 19 and the blade of shear 25. This distance is fixed and predetermined and is selected to be smaller than the shortest cut bar to be produced by the apparatus. As will be more clearly described hereinafter, articles delivered to the shearline are caused to abut against plate 19 before the measuring operation commences, the shear operation being accomplished after measuring. Thus, the distance d establishes the minimum measured dimension which can be produced by the equipment. Conventionally, this dimension would be selected to be approximately 2 feet.

The apparatus generally illustrated in FIGS. 1 and 2 can be understood more clearly from the more detailed illustration of FIGS. 3–7 wherein the same numbers are used for the various components illustrated therein.

As will be seen, the frame 10 includes channel members 30 and 32 extending longitudinally along the sides of the conveyors, channel 30 having an outwardly extending flange member 34 which is pivotally connected to a mounting plate 35 by a pin assembly 36 of conventional design. Plate 35 is mounted on a support leg 37 and braced by a channel member 38. A plurality of such pivotal connections can be provided, the number thereof depending upon the length and weight of the entire conveyor assembly.

Channel member 32 is provided with a downwardly extending tab 40 which is pivotally connected to a link 41 connected to the drive shaft 42 which is integrally connected to a piston in a piston and cylinder assembly indicated generally at 43.

Figure 7:
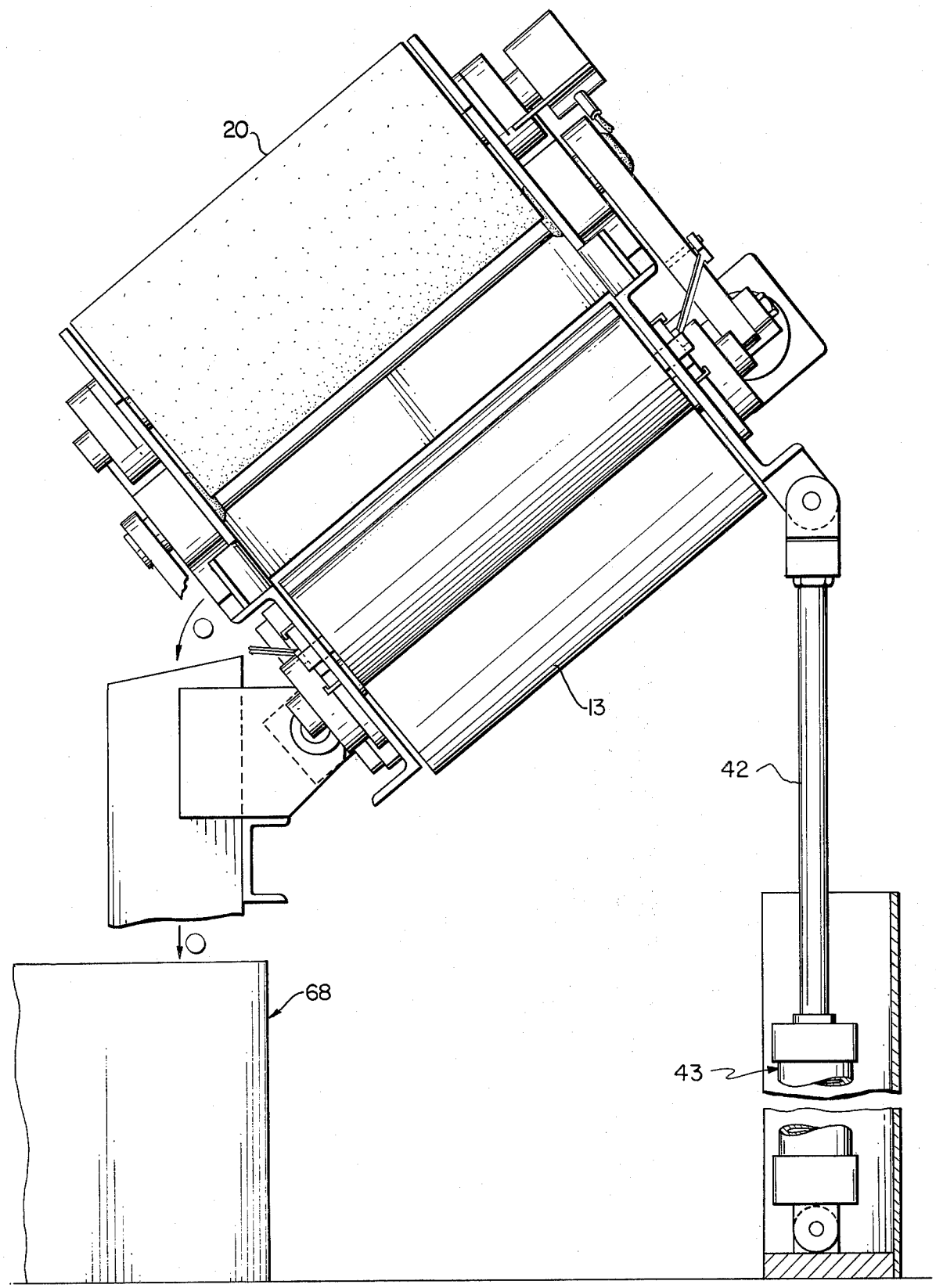
FIG. 7 is an end elevation of the apparatus of FIGS. 1–6 with the shearline apparatus in discharge position.

Assembly 43 can be supplied with fluid under pressure, either hydraulic or pneumatic, to extend drive shaft 42 and elevate channel 32, thereby simultaneously pivoting the frame about pin 36 as illustrated in FIG. 7.

Between frames 30 and 32 there extends an axle 45 which is journaled in suitable bearing assemblies 46 and 47, connected to frame members 30 and 32, respectively, so that axle 45 can rotate freely about its axis. Roller 12 is supported on axle 45 and supports one end of belt 13 for free movement in conveyor fashion. A similar assembly exists to support roller 11 but is not shown in specific detail.

Figure 3:
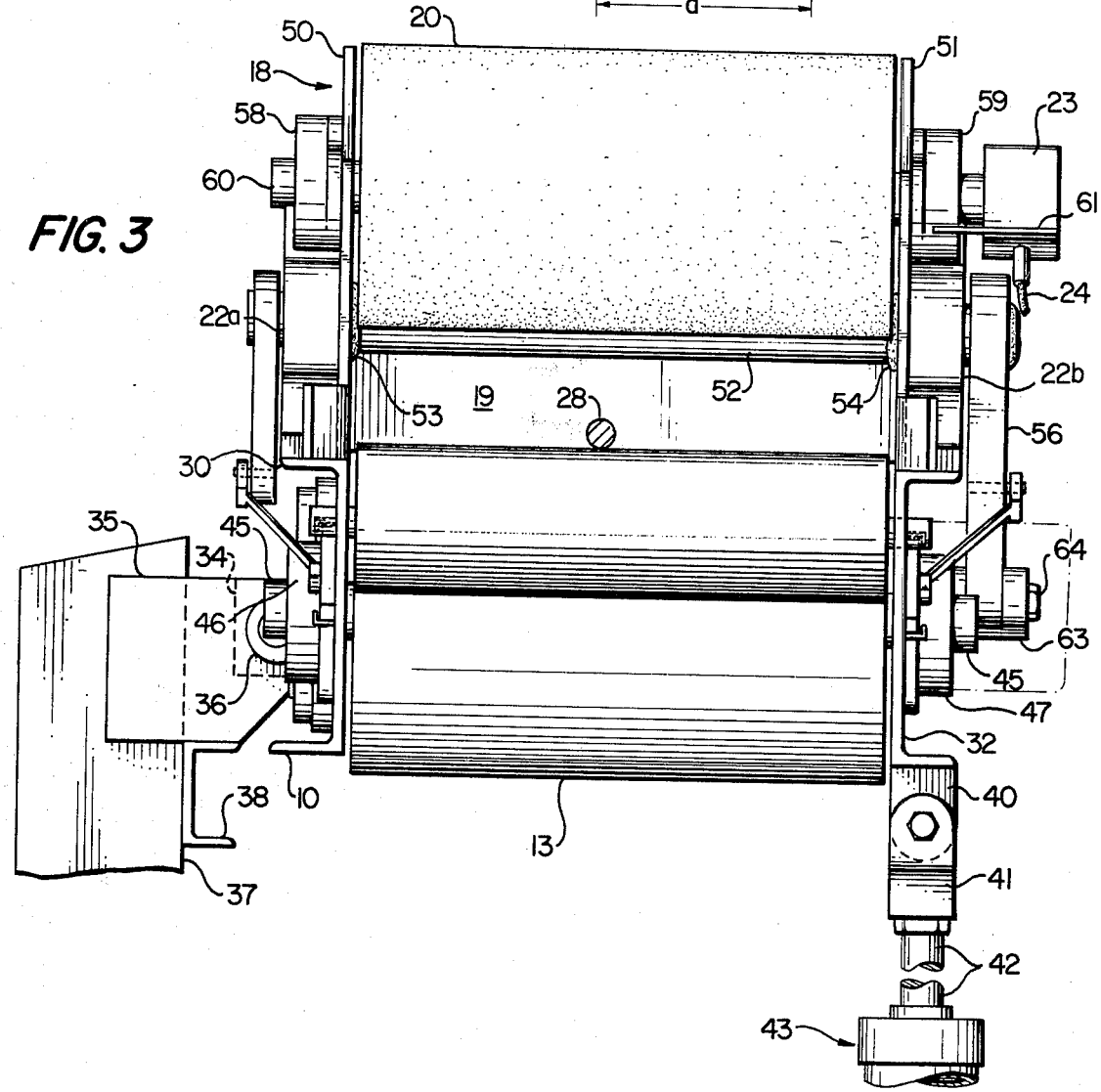
FIG. 3 is an end elevation, along lines 3—3 of FIG. 1, of a shearline apparatus according to the invention.
Figure 4:
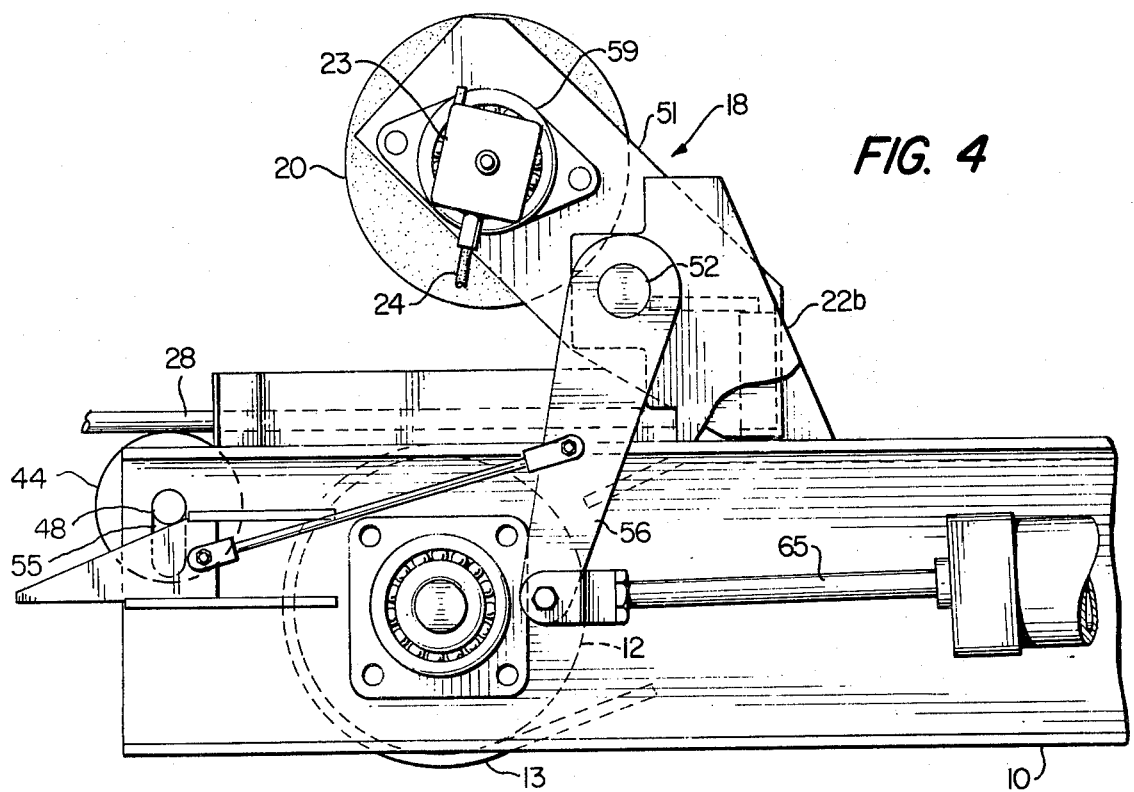
FIG. 4 and 5 are partial side elevations of the inlet end of the shearline of FIGS. 1–3 showing two positions of the abutment plate, roller and bracket assembly.
Figure 5:
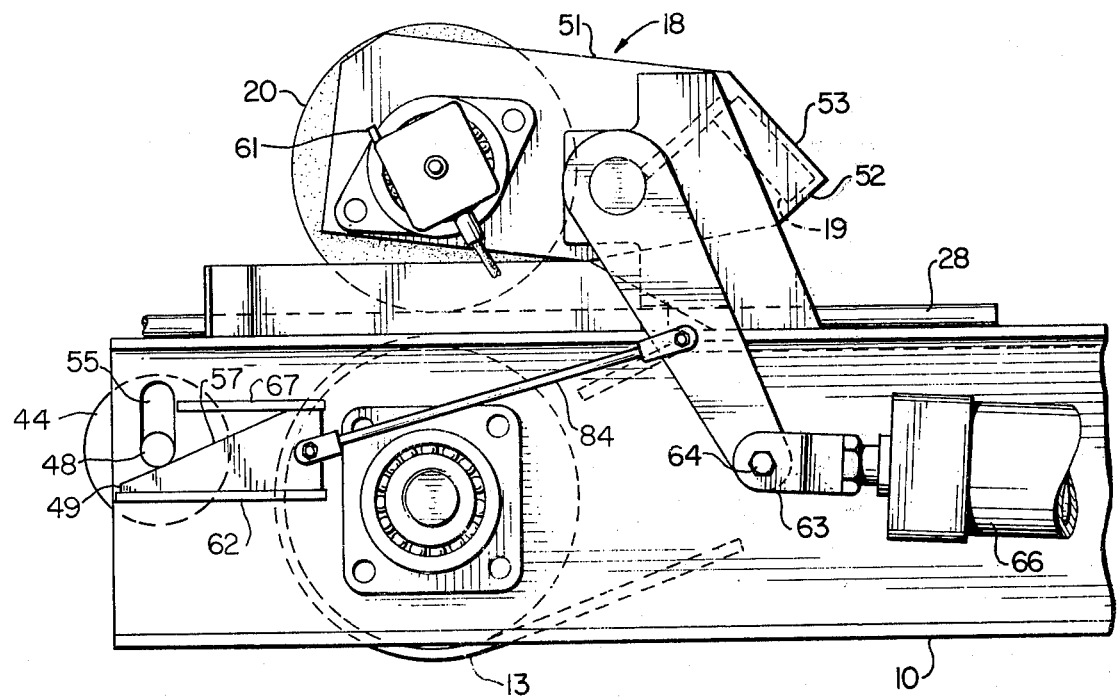
Figure 6:
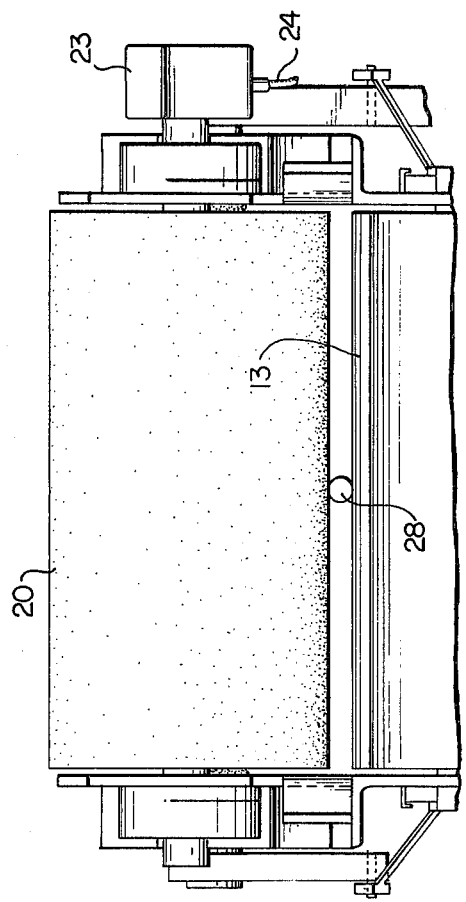
FIG. 6 is an end elevation of FIG. 5 with the bracket in the position shown therein.

Bracket means 18 includes first and second side plates 50 and 51 which are generally rectangular in form but which have angled end surfaces 52 and 53 to conform to abutment plate 19, which extends between the end plates, and to the upper surface of frame 10 against which surface 52 rests in the position shown in FIG. 4. As seen in FIGS. 3–5, plates 50 and 51 are provided with an axle 52 which is fixedly attached to plates 50 and 51 as by welds 53 and 54. The axle protrudes outwardly beyond the end plate and extends through journals in upstanding supports 22a and b so that the axle and the end plate are pivotable about the axis as a unitary assembly. A crank arm 56 is attached to the distal end of axle 52 so that movement of the crank arm rotates the axle and the remainder of assembly 18.

As previously indicated, abutment plate 19 extends between the downstream ends of plates 50 and 51, being securely attached thereto as by welding. At the other end of the plates are bearing means 58 and 59 through which an axle 60 extends. Roller 20 is mounted on and freely rotatable with axle 60 in bearings 58 and 59. A pulse producing device 23 is coupled to the end of axle 60 and its housing is prevented from rotating with axle 60 by a stop such as 61.

The lower end of crank arm 56 is pivotally attached to a conventional U-shaped link 63, as by a bolt 64, the link being connected to the drive shaft 65 of a piston and cylinder assembly 66, this again being a conventional pneumatic or hydraulically powered assembly capable of extending and retracting the drive shaft upon receipt of a control signal from the control unit. As seen in FIGS. 4 and 5, with drive shaft 65 fully extended, surface 52 of side plates 50 and 51 is lowered to be in contact with frame 10 and to place the lower edge of abutment plate 19 in transverse, closely spaced relationship with the upper surface of belt 13, while roller 20 is elevated above the belt to a position which permits the insertion of articles thereunder. With the drive shaft retracted, abutment plate 19 is elevated to a position which permits passage of articles on belt 13 and roller 20 is lowered until it comes in contact with the upper surface of the stock 28 being conveyed on belt 13. Clearly, the position to which roller 20 is lowered depends upon the thickness of the stock, which thickness can vary depending upon the size of the reinforcing bar being processed by the shearline equipment.

The material used for conveyor belt 13 is desirably a resilient material such as rubber reinforced with steel wires and the like in conventional fashion. The surface of the belt is subject to severe abrasion if the sharp ends of previously cut rods are pushed across the surface of the belt. Also as previously indicated, the belt does not normally move until after the rod ends are caused to abut plate 19, having traversed some portion of the belt end. Accordingly, a mechanism is incorporated to protect the belt from unnecessary wear. This mechanism includes a passive roller 44 which is mounted on and rotatable with an axle 48. The ends of axle 48 extend axially beyond the end limits of roller 44 and extend through vertically elongated slots 55 which are provided in side plates 32 and 30. Slots 55 permit vertical motion of the axle and roller between an upper position in which the upper surface of roller 44 lies slightly above the upper surface of the conveyor belt, and a lower position, as shown in FIG. 5, in which roller 44 is completely clear of the incoming work.

The roller is moved between those two positions by a mechanism which includes cam plates 49, each such plate having an upper inclined surface 57 which is in contact with one of the protruding ends of axle 48. Plates 49 are supported by a lower guide rail 62 and an upper guide rail 67 and are caused to reciprocate between the positions shown in FIGS. 4 and 5 by a link mechanism connected to the same apparatus which operates the bracket means 18. A link 84 is pivotally connected at one end to plate 49 and, at its other end, to crank arm 56.

A similar crank arm 85 is connected to the other end of axle 52 to operate the plate at the opposite end in a similar fashion.

In operation, one or more articles 28 are delivered to the inlet end of the shearline apparatus with bracket means 18 in the position shown in FIG. 4, i.e., with abutment plate 19 disposed closely adjacent to and transversely of belt 13. The articles thus delivered are caused to ride across roller 44 and are brought in contact with, and at rest against, abutment plate 19, thereby assuring that, first, the ends of various articles to be cut are aligned with each other against the abutment plate, and, secondly, that the conveyor are a known, predetermined distance from the blade of shear 25. The control mechanism is then actuated to provide a first signal causing piston and cylinder assembly 66 to retract drive shaft 65, moving bracket means 18 to the position shown in FIG. 5 wherein the abutment plate is lifted out of the path of travel of the stock and roller 20 is lowered so that it is in contact with the upper surface of the stock. Roller 44 is also lowered out of contact with the work. The conveyorr drive is then actuated, causing belt 13 to convey the stock toward the outlet end. Frictional engagement between the upper surface of the stock and roller 20 causes the roller to be rotated, thereby causing pulse unit 23 to produce pulses which are electrically conveyed to and counted by counting means in the control unit. The counting means is provided with a predetermined total representative of a desired length of stock. When that total is reached the conveyor drive is de-energized and shear drive 27 is actuated, causing the shear blade to sever the stock at the desired length. Then, the conveyor drive is again energized, causing the conveyor to move the cut stock further along the belt to a selected location at which the tilting mechanism including a plurality of piston and cylinder units 43 are simultaneously actuated, causing the entire frame and conveyor assembly to be tilted about the axis described by pins 36 and causing the stock to be discharged from the conveyor surface as illustrated in FIG. 7. The cut stock can be retrieved by bins such as generally indicated at 68. A plurality of such bins can be disposed along side frame 10, the actual possible number thereof being a function of the length of the conveyor and the lengths of stock to be cut.

It is contemplated that the materials employed in the manufacture of the apparatus thus far described would be primarily steel or other suitable metals with the exception of the pulse producing unit 23, roller 20, belt 13 and the various gaskets and seals used throughout the pneumatic or hydraulic portions of the apparatus. Belt 13 is a conventional form of conveyor belt and comprises a heavy duty natural or synthetic rubber reinforced with metallic strands. Roll 20 is similarly a resilient material, but sufficiently hard to resist indentation, it being recognized that significant indentation would result in a change of the circumference of the roller and, therefore, an alteration of the accuracy of measurements. It is particularly desirable that the roller and conveyor be made of a material which is relatively noisefree so that the entire apparatus, in addition to being simpler and less expensive than previous shearlines produces less noise and therefore can exist in a more tolerable environment. Roller 44, however, is preferably steel.

In a typical model, roller 20 would be designed to measure two feet of rod for each rotation of the roller. The diameter of the roller is therefore approximately 7.639 inches.

Figure 8:
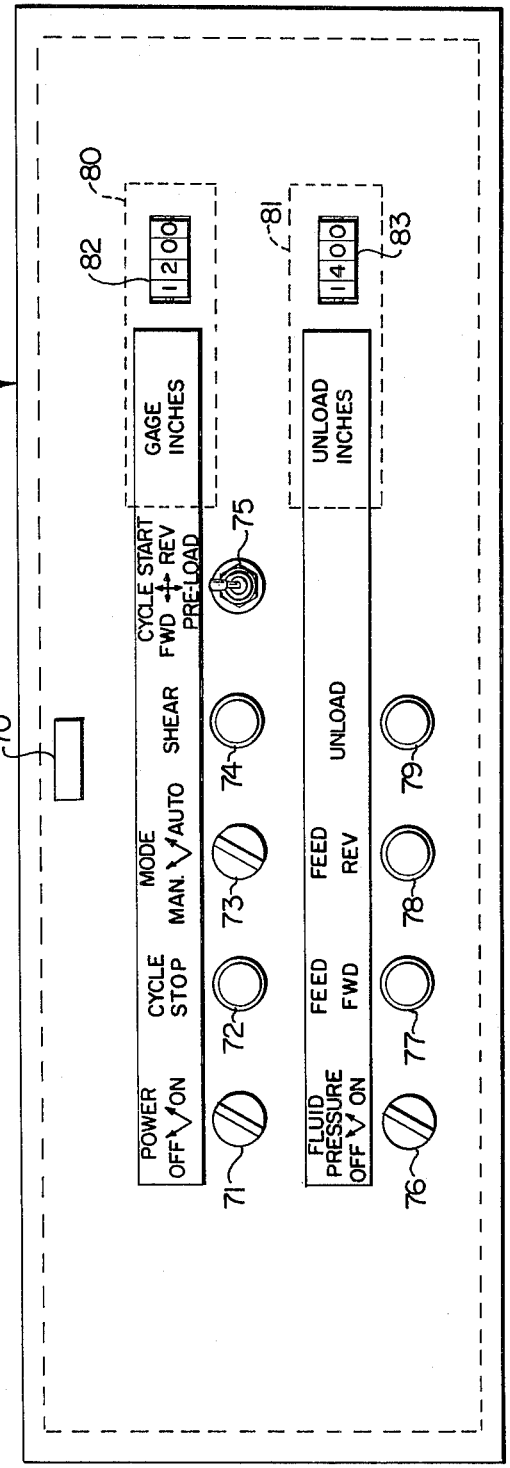
FIG. 8 is a schematic diagram showing the arrangement of controls in a typical control system for the apparatus of FIGS. 1–7.

In FIG. 8 is shown a typical plan for a control panel usable with the apparatus of FIGS. 1–7 to control the operations thereof. The various switches, counters and other control devices being of a completely conventional nature, there is no need to discuss details thereof. However, a discussion of the controls will assist in understanding the operation of the device.

First, it will be observed that the panel, indicated generally at 69, is provided with an illuminated indicator 70 to inform the operator that the power for this system is on. A selector switch 71 is provided to turn the power on or off. As a safety measure, or to interrupt a cycle which was inadvertently initiated or improperly set up, a cycle stop push button 72 is also provided, this being for the purpose of interrupting the sequence of events without de-energizing the system. A mode switch 73 permits the operator to select a manual mode in which the conveyor advance and other operations can be individually and separately controlled, or an automatic mode in which a complete cycle of measuring, cutting and unloading is accomplished without manual intervention. A push button 74 permits the shear to be independently operated.

A four position switch 75 can be moved in any one of four directions and is a momentary contact switch in each of those positions. Upward movement of the switch handle initiates an automatic cycle while movement to the left or right causes conveyor belt 13 to be moved in a forward or reversed direction for only so long as the switch is held in that position. There is also provided a position identified as "pre-load" which relates to operation of a feed mechanism such as might replace input conveyor 29, the details of which do not form a part of the present invention.

The fluid pressure for the pneumatic or hydraulic portion of the system can be independently turned on or off by operation of a selector switch 76. Forward feed or reverse feed of the conveyor belt can be initiated by push button switches 77 or 78, these being switches to turn on the belt for continuous motion as might be required during maintenance. Unload operation can be independently accomplished in manual operation by depressing push button switch 79 which energizes the piston and cylinder assemblies 43.

The counter means for receiving the pulses produced by pulse generator 23 includes a selector and counter assembly 80 and a similar selector and counter assembly 81. Unit 80 includes a set of four front wheel selector switches forming a selector and display 82 permitting the operator to select the length of each cut bar to be produced by the machine. The switches, as shown in FIG. 8, have been selected to show feet and tenths thereof and have been moved to a position representing 12.00 feet.

The selector switches establish a count at which the conveyor is to be stopped and the shear operated. That preset count established by the selector switches operates, in a manner well known in the art, to preset a register to receive that count and to produce an output signal when it is reached.

Unit 80 thus also includes pulse producing means to preset the counter and the necessary logic therefor, and is connected to receive pulses from unit 23. It will be noted that the register necessarily includes an initial offset comprising a number of pulses equivalent to the distance between squaring abutment plate 19 and shear 25, i.e., the distance $d$ in FIG. 2. The unit can also include means for producing a preliminary output signal a predetermined number of pulses before the full count is reached, this preliminary signal being used to decelerate the movement of the conveyor so that stock carried thereby is not caused to slide or otherwise move in an uncontrolled fashion by the sudden stop of the conveyor belt. It will be recognized that the conveyor belt moves at a relatively high speed and that the articles carried thereby have considerable mass.

Unit 81 is substantially identical to unit 80 and includes an array of thumb wheel selector switches 83 which are employed in a similar fashion, except that the number set therein determines the distance to be traveled by belt 13 after the shear has been operated. Once the stock has been cut, the belt is moved until it reaches the desired unload position, this being indicated by pulses received from pulse generator 23 as it rides along the top of the cut stock and, after the stock passes the point of the roller, on the surface of belt 13. Pulses generated thereby are counted by unit 81 until the preset number is reached at which time the unload mechanism is energized and stock is dumped into the appropriate receiving bin as previously described with reference to FIG. 7.

Figure 9:
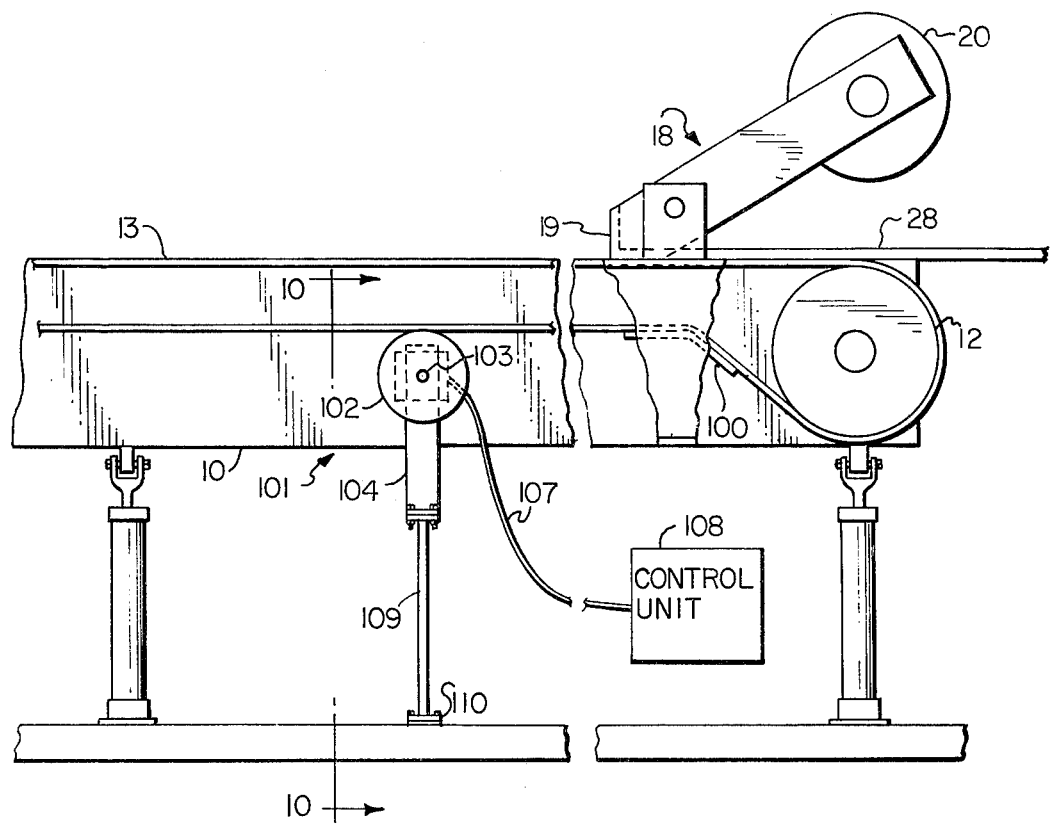
FIG. 9 is a partial side elevation, in partial section, of a further embodiment of the invention.
Figure 10:
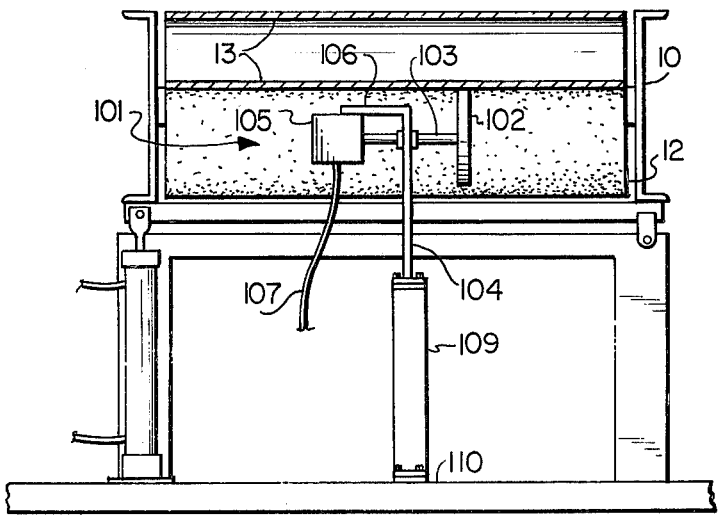
FIG. 10 is a section along lines 10—10 of FIG. 9.

A further embodiment of an apparatus according to the invention is shown in FIGS. 9 and 10 in which the drawings of the basic apparatus are shown in simplified form with details of the basic apparatus being omitted for simplicity. As shown in these figures, the basic conveying apparatus including frame 10, belt 13 and the support rollers for the belt are the same as previously described, roller 12 being illustrated in FIGS. 9 and 10. Also the assembly including bracket means 18 with abutment plate 19 and holding roller 20 is essentially the same, the major difference being that the work-holding roller 20 no longer has a pulse producing device connected therewith. The bracket means, abutment plate and holding roller are omitted from FIG. 10.

The lower portion of belt 13 is caused to pass over a supporting and guiding plate 100 to elevate and control the operating level of that portion of the belt. As the belt returns from the downstream end of the conveyor, it passes over plate 100 which is shaped to guide it from the downstream end and tangentially toward roller 12.

Of particular significance in FIGS. 9 and 10 is the provision of a metering and pulse-producing apparatus indicated generally at 101, this apparatus being disposed beneath the belt. A metering wheel 102 is mounted on an axle 103 which is supported for rotation in a vertical mounting plate 104. The opposite end of axle 103 is connected to a pulse generating unit 105 which is identical in nature and function to unit 23 used in conjunction with apparatus of FIGS. 1–8. The pulse generating unit is mounted, by a bracket 106, to mounting plate 104 so that it does not rotate. Pulses produced by unit 105 are coupled through a conductor cable 107 to a control unit 108 which functions in the manner of the control unit shown in FIG. 2 and will not be further described.

Mounting plate 104 is supported on a stand 109 which rests on a structural crosspiece connected to the machine frame.

The operation of the apparatus shown in FIGS. 9 and 10 is substantially identical to that described in conjunction with the embodiments of FIGS. 1–8 except that the wheel is in contact with the belt and pulses are therefore produced whenever the belt is moved, as distinguished from the operation of the pulser connected to the roller 20 in which pulses are produced only when the roller is brought into contact with the moving stock. Thus, it is necessary that control units 108 be designed to ignore any pulses produced when abutment plate 19 is in contact with the upper surface of the belt. When bracket means 18 is actuated to raise the abutment plate and lower the roller 20 to be in contact with the work, pulses produced by unit 105 are then counted to measure the stock as it moves along the upper surface of belt 13. Since the work-holding roller maintains firm contact between the belt and the stock, motion of the stock and motion of the belt are identical insofar as linear movement is concerned and the measurement produced by pulser 105 is as reliable as measurements produced by unit 23. It has been found, however, that removal of the pulse unit from the movable bracket means provides certain advantages under conditions of vibration and the like and therefore produces more reliable information and more accurate measurements under some circumstances.

While certain advantageous embodiments have been chosen to illustrate the invention, it will be understood by those skilled in the art that various changes and modifications can be made therein without departing from the scope of the invention as defined in the appended claims.

What is claimed is:

1. An apparatus for measuring and cutting elongated stock comprising the combination of
an elongated frame;
an endless conveyor belt;
means for mounting said belt for movement on said frame to form a conveyor;
means for driving said belt in a direction to carry articles from an inlet end toward an outlet end of said conveyor;
an abutment plate;
a work-holding roller having an axis of rotation;
bracket means for supporting said plate and said roller;
means for pivotally mounting said bracket means on said frame with said plate and the axis of said roller perpendicular to the direction of motion of said belt;
means for pivoting said bracket means between a first position in which said plate is adjacent to said belt and said roller is spaced from said belt a distance sufficient to permit the passage of stock on said belt, and a second position in which said plate is spaced from said belt a distance sufficient to permit the passage of stock and said roller is spaced from said belt by a distance determined by the thickness of stock placed thereon so that said roller is rotated by contact with stock carried by said belt;
means for producing signals representative of the amount of longitudinal motion of the stock carried by said belt when said bracket means is in said second position; and
shear means mounted a predetermined distance from said plate and spaced from the inlet end of said conveyor to cut said stock.

2. An apparatus according to claim 1 and further comprising
second conveyor means for delivering elongated stock to said shear and the inlet end of said conveyor.

3. An apparatus according to claim 1 wherein said means for producing signals comprises
means attached to said roller for producing electrical pulses representative of increments of rotary motion thereof as said roller is rotated in contact with moving stock 4. An apparatus according to claim 3 and further comprising
control means connected to said means for producing pulses, said shear, said means for driving said belt and said means for pivoting said bracket means, for controlling the operation of said apparatus to measure and cut pieces of stock.

5. An apparatus according to claim 1 and further comprising
hinge means for supporting said frame along one side for limited pivotal movement about a horizontal axis parallel to the direction of movement of said belt; and
means for vertically moving the side of said frame opposite said one side of dump cut stock from said belt.

6. An apparatus according to claim 1 wherein said bracket means comprises
first and second end plates
bearing means in each of said end plates for rotatably supporting said roller between said plates;
an axle extending between said plates and defining a pivot axis for said bracket means;
said abutment plate being connected between said end plates so that said axle lies between said abutment plate and said bearing means in each plate;
and wherein said means for pivotally mounting said bracket means includes
first and second mounting blocks attached to said frame and having journal openings for said axle spaced from said belt so that only one of said roller and said abutment plate can be adjacent said belt at a time.

7. An apparatus according to claim 6 wherein said means for pivoting said bracket means includes
a crank arm attached to said axle; and
fluid actuated piston means for moving said crank arm and said bracket means.

8. An apparatus according to claim 7 and further comprising
roller means for maintaining the end segments of oncoming stock spaced above the surface of said belt at said inlet end, said roller means comprising
a passive roller mounted for free rotation about an axis parallel with the axis of said metering roller; and
means for moving said passive roller between an upper position in which the uppermost portion of said passive roller lies in a plane above the upper surface of said belt and a lower position in which said roller is below the upper surface of said belt.

9. An apparatus according to claim 8 wherein said means for moving said passive roller is attached to said means for pivoting said bracket means and moves synchronously therewith.

10. An apparatus according to claim 1 and further comprising
roller means for maintaining the end segments of oncoming stock spaced above the surface of said belt at said inlet end, said roller means comprising
a passive roller mounted for free rotation about an axis parallel with the axis of said work-holding roller; and
means for moving said passive roller between an upper position in which the uppermost portion of said passive roller lies in a plane above the upper surface of said belt and a lower position in which said roller is below the upper surface of said belt.

* * * * *